United States Patent [19]
van der Hoorn et al.

[11] Patent Number: 4,801,259
[45] Date of Patent: Jan. 31, 1989

[54] DEVICE FOR PRODUCTING CONICAL CASES FROM STRIPS OF DOUGH MATERIAL WOUND ON A CARRIER

[75] Inventors: Rudolf J. G. A. van der Hoorn, Neunen; Henrikus P. M. Clerx, Baarlo, both of Netherlands

[73] Assignee: Houdstermaatschappij De Goede B.V., Amsterdam, Netherlands

[21] Appl. No.: 92,864

[22] Filed: Sep. 3, 1987

[30] Foreign Application Priority Data

Sep. 3, 1986 [NL] Netherlands .................. 8602232

[51] Int. Cl.$^4$ ............................................. A01J 21/02
[52] U.S. Cl. .................. 425/305.1; 425/306; 425/334; 425/371; 425/391
[58] Field of Search ............... 425/334, 312, 310, 315, 425/306, 305.1, 307, 391, 371, 372

[56] References Cited

U.S. PATENT DOCUMENTS

| | | | |
|---|---|---|---|
| 1,903,572 | 4/1933 | Schroder | 425/334 |
| 2,687,699 | 8/1954 | Oakes | 425/310 |
| 3,604,367 | 9/1971 | Arries | 107/69 |
| 4,150,935 | 4/1979 | Venzo | 425/305.1 |

Primary Examiner—Bernard Nozick
Attorney, Agent, or Firm—Ralph M. Burton

[57] ABSTRACT

Device for producting conical cases from strips of dough, wound on a carrier, with a first supply ascending under belt for these strips, a second supply belt, the end of the first belt, and winding units each movable at a right angle to said second belt, and each with a detachable carrier on a rotary core.

9 Claims, 3 Drawing Sheets

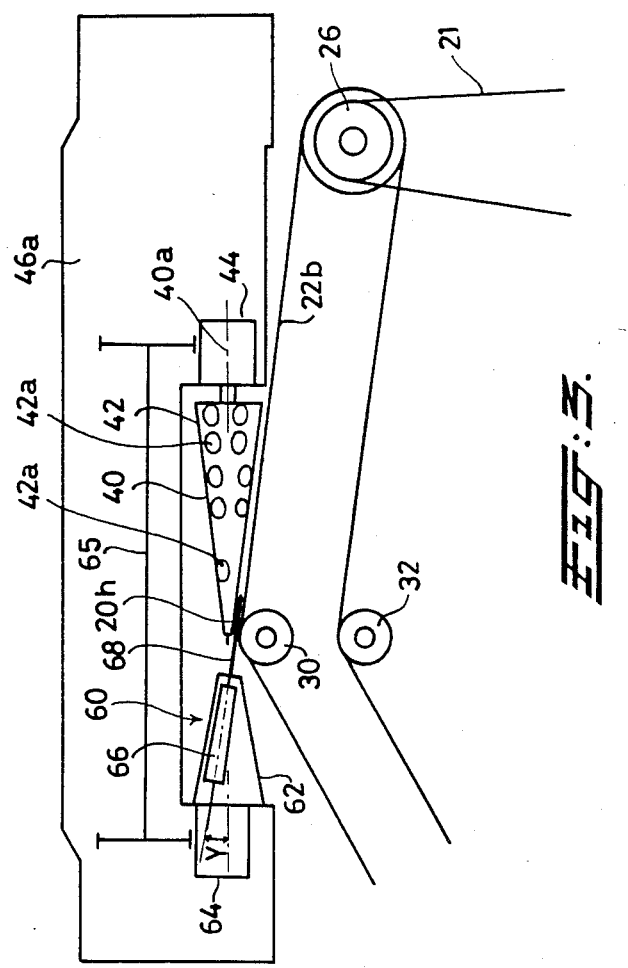

DEVICE FOR PRODUCTING CONICAL CASES FROM STRIPS OF DOUGH MATERIAL WOUND ON A CARRIER

BACKGROUND OF THE INVENTION

The invention relates to a device for the production of conical cases from dough material.

DESCRIPTION OF THE PRIOR ART

Until now, such cases, which are intended, for example, after baking, for filling with whipped cream or other material fit for consumption, have been produced by hand: the end of a narrow strip of dough is pressed with both hands against the tip of a rotating conical carrier, and the strip is then guided by hand along the outside surface of the carrier.

SUMMARY OF THE INVENTION

The object of the invention is to produce a device with which such cases can be produced mechanically.

For this purpose, the device according to the invention comprises:
- a first endless supply belt, on which narrow strips of dough, arranged side by side transversely to the lengthwise direction of the belt, are supplied,
- a second endless conveyor belt which is linked to the first belt in the lengthwise direction thereof, and which has, ascending at an obtuse angle under the end of the first belt, a first part, on which the dough strips are taken over, and a second part connecting thereto via a guide roller, and
- a number of winding units which are movable at right angles to the lengthwise direction of this second part, each with a detachable carrier disposed on a rotary core and having a conical outer surface whose tip is directed against the direction of movement of the second belt, while the speed of rotation of the carriers at the beginning of the winding process is greater than at the end thereof, in such a way that the peripheral speed is greater than the unwinding speed over the belt an decreases during the winding until these speeds are substantially equal.

In a preferred embodiment the guide roller is disposed in the winding direction of movement of the carriers at an angle to the crosswise direction of the conveyor belt and is slinghtly downward-sloping in the longitudinal direction of the conveyor belt.

Preferably each winding unit, disposed opposite and in line with the core and carrier, comprises a rotary dough strip carrier which is driven at the same speed in the same direction and has a oblong, controlled, to and fro moving take-up needle, which is disposed below half the carrier apex angle relative to the carrier centre line, and in the extended position is parallel to the outer surface of the carrier.

Advantageously the second part of the second belt is downward-sloping along half the apex angle of the conical carrier.

BRIEF DESCRIPTION OF THE DRAWINGS

FIG. 3 is a schematic side view of a modified embodiment of the winding unit used therein;

DESCRIPTION OF A PREFERRED EMBODIMENT

Figure 1:
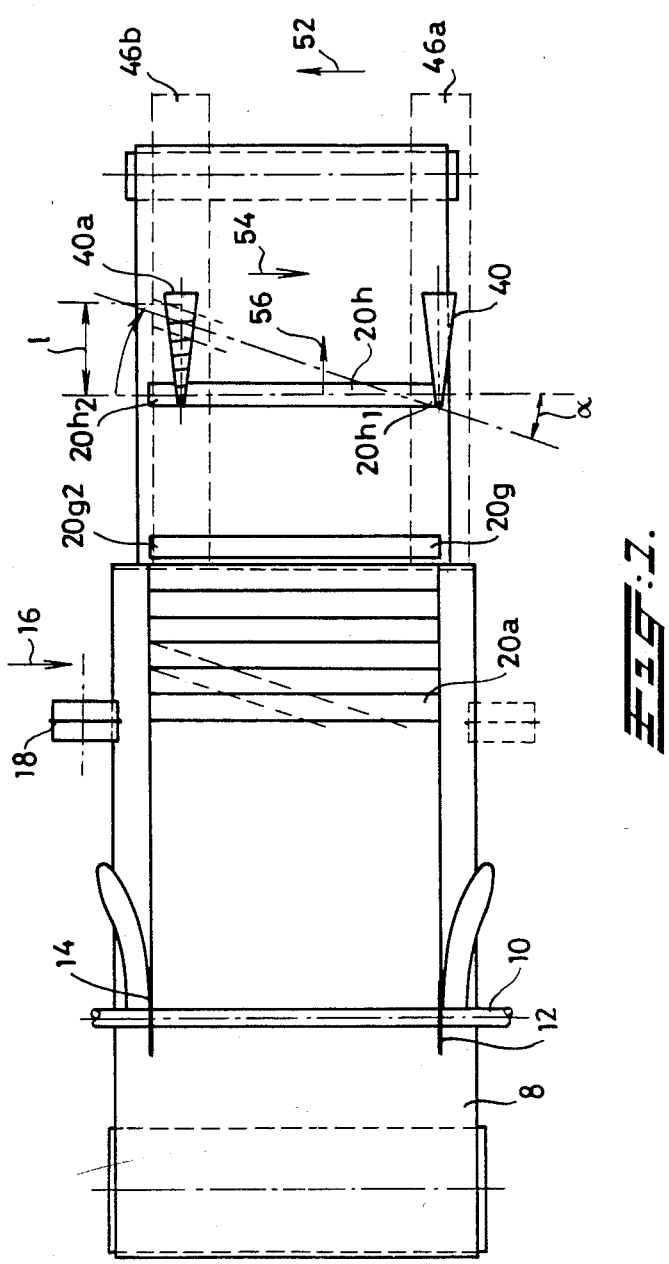
FIG. 1 is a schematic top view of a device according to the invention.

The embodiment shown in the figures comprises a first endless conveyor belt 2, guided at the left end over de guide roller 4, and guided at the right end over a guide strip 6 with sharp front edge. Supplied continuously on this belt is a dough slab 8, which is cut to a constant width by means of two longitudinal cutting knives 12, 14, disposed on the rotary shaft 10, and is then cut into individual strips 20a ... 20h by means of the rotary cutting knife 18, which moves to and fro at right angles to the belt in the direction of the arrow 16. The belt 2 is driven intermittently by means of a drive mechanism (comprising a continuously running drive motor 3, a first belt 5, an electrically controlled coupling 7 (for instance of the type marketed by Warner Electric Brake and Clutch Cie., Beloit, Wisc., U.S.A.) and a second belt 9), and during the standstill periods of the belt the cutting knife 18 executes the stroke in the direction of the arrow 16, and the strips 20a ... 20h are formed.

Figure 2:
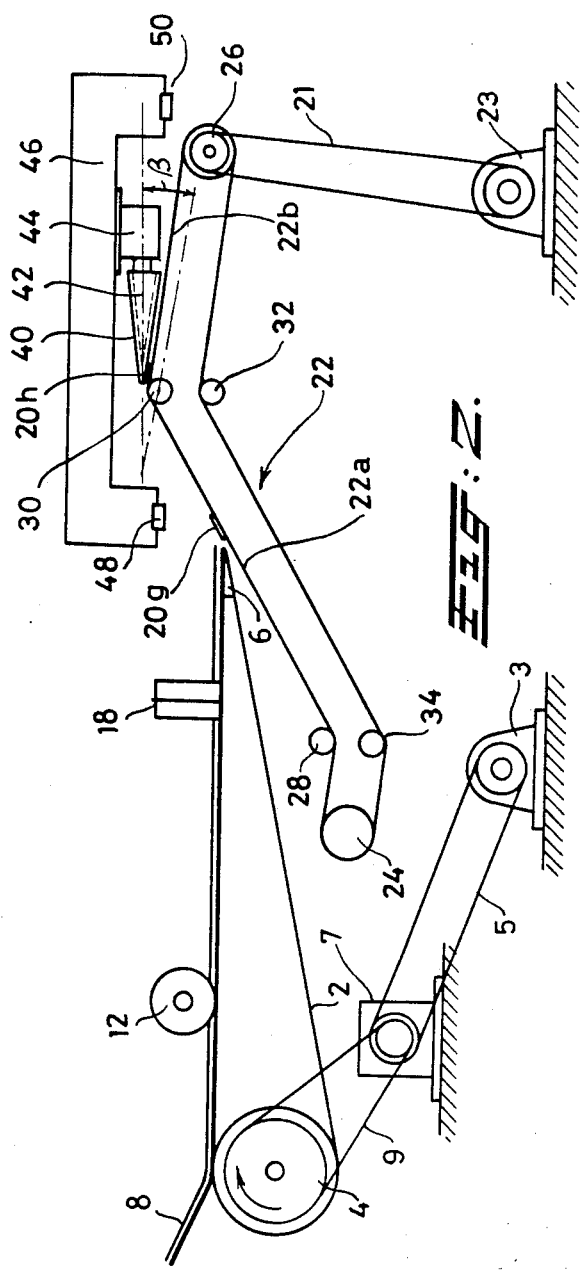
FIG. 2 is a schematic side view of said device.

A second conveyor belt 22 is guided with its ends over the guide rollers 24 and 26 and is also guided over the guide rollers 28, 30, 32, 34. The roller 30 is situated at a higher level than the roller 28, so that an upward-sloping conveyor belt part 22a is formed, on which the strips of dough—in the case illustrated the strip of dough 20g—are taken over. The roller 26 is disposed, at a lower level than the roller 30, so that a second, slightly downward-sloping belt part 22b is formed, where the winding up of the dough strips fed in takes place. The conveyor 22 is driven via a belt 21 by the drive motor 23. It is observed that FIG. 2 shows the belt 22 in cross-section.

Each dough strip is wound onto a conical carrier 40, which is detachably disposed on a core 42. The conical carrier is made of metal, and there is a number of small flat magnets 41 in the core 42. The core is rotated by means of a suitable drive mechanism, symbolically indicated by the square 44. The drive mechanism 44 is accommodated in a winding unit 46, which by means of suitable, schematically indicated guides 48, 50 can move in the crosswise direction of the belt 22b, thus in the direction of the arrow 52 in FIG. 1, and perpendicular to the plane of drawing of FIG. 2. During this movement the carrier 40 is rotated, and it is clear that this rotary movement can be derived from the movement of the winding unit itself. After the completion of the winding operation, thus when a strip of dough has been wound onto the carrier 40, the winding units pass a station where the wound carrier is removed, and where a new carrier is place on the core 42.

The device operates as follows:

By the intermittent movement of the supply belt 2, strips of dough are placed at regular intervals on the ascending part 22a of the belt 22. The various movements are here synchronized in such a way that, when a strip of dough—such as the strip 20h—passes the guide roller 30 and is thus at the start of the descending part 22b of the belt, a winding unit 46 with carrier 40 is above the right end of the strip 20h, viewed in the direction of movement indicated by the arrow 56, and indicated by 20h1. The unit 46 is then moved in the direction of the arrow 52 and, since the strip 20h moves in the direction of the arrow 56, the strip 20h is wound onto the carrier 40, beginning at the tip thereof. The drive 44 is designed insuch a way that the peripheral speed of the carrier 40 is greater at the beginning of the winding operation and is opposed to the speed of advance of the winding unit. During the winding operation this speed is reduced until the two speeds have become equal at the end of the operation, and normal unwinding takes place. As a result, the dough is stretched at the beginning of the winding process, and the cross section of the dough material is prevented from being greater at the tip than on average over the cone, through the multiple overlapping in the beginning, which means that during subsequent baking no thicker part will form at the tip. The speeds are adapted to each other in such a way that when the strip 20h was moved over the distance 1 in the direction of the arrow 56, the other end 20h2 of the strip 20h is wound entirely onto the carrier 40, which is then moved entirely from right to left in the direction of the arrow 56 to the position shown by 40a, since the winding unit 46 has moved from the position 46a to the position 46b. In the meantime a new winding unit has arrived in the position 46a and has already begun with the winding of the next strip of dough, i.e. the strip 20g, onto the carrier thereof. By the slanting arrangement at angle α of guide roller 30 in the crosswise direction of the belt, the tip of the carrier, which is provided with dough, can be moved above a slope (S) in the conveyor belt and thus always has a clear space from the next strip of dough lying below it. Of course, by the winding of the strip of dough, the total external diameter of the carrier plus dough layer has increased. For a good pressing of the strip of dough onto the carrier, it is necessary that the guide roller 30 should also be slightly downward-sloping in the direction of winding. This angle is preferably chosen in such a way that the conveyor belt descends in the lengthwise direction at an angle equal to half the apex angle of the carrier.

FIG. 3 shows a modified embodiment of the winding unit, which is provided with means for gripping the end of the strip of dough to be wound up and for taking this end of the strip round the end of the carrier, which give more reliable working. Corresponding parts are indicated in this figure by the same reference numbers as those used in FIGS. 1 and 2.

In the embodiment shown in FIG. 3, each carrier 40 with core 42 has disposed opposite it a dough strip holder 60, situated in line with the carrier 40, and thus on the centre line 40a thereof. It has a housing 62, which is rotated by the drive 64. The latter is coupled to the drive 44 of the core 42 (which is schematically shown with the coupling shaft 65), so that the housing 62 rotates at the same speed and in the same direction as the carrier 40. Located in the housing 62 is an air cylinder 66, the piston rod of which is connected to a take-up needle 68. The angle between the shaft of the needle 68 and the centre line 40a corresponds to the angle β in FIG. 2, and thus to half the apex angle of the carrier 40. The whole arrangement is such that, as the figure shows, in the extended position of the needle it touches the outer surface of the carrier 40. Since the dough strip holder 60 is driven at the same speed as the carrier 40, in the extended position the needle 68 is at a standstill relative to the surface of the carrier 40.

The whole operates as follows:

As soon as the end of the dough strip 20h is under the tip of the dough strip, suitable control means (not shown) activate the air cylinder, which causes the needle 68 to shoot outwards and into the side edge of the dough strip. The winding now begins, in principle being carried out in the way described above, the only difference being that the extended needle lifts the end of the dough strip 20h from the surface of the belt 22h and winds it round the end of the carrier 40. As stated, the relative speeds of the needle 68, the dough strip 20h and the carrier 40 are here zero. After at least one revolution of the carrier 40, the needle 68 is retracted, and the winding process takes place as described above.

After the winding, the wound carriers are removed from the cores, and the product obtained can undergo the necessary subsequent treatments, such as sprinkling with sugar and prebaking.

What is claimed is:

1. Device for producting of conical cases from strips of dough material wound on a carrier, comprising
    a first endless supply belt, on which narrow strips of dough, arranged side by side transversely to the lengthwise direction of the belt, are supplied,
    a second endless conveyor belt which is linked to the first belt in the lengthwise direction thereof, and which has, ascending at an obtuse angle under the end of the first belt a first part, on which the dough strips are taken over, and a second part connecting thereto via a guide roller disposed at an angle, and
    a number of winding units which are movable at right angles to the lengthwise direction of this second part, each with a detachable carrier disposed on a rotary core and having a conical outer surface whose tip is directed against the direction of movement of the second belt, while the speed of rotation of the carriers is greater at the beginning of the winding process than at the end thereof, in such a way that the peripheral speed at the beginning of the winding process is greater than the unwinding speed over the belt and decreases during the winding process until these speeds are equal.

2. Device according to claim 1, in which the guide roller is disposed in the winding direction of movement of the carriers at an angle to the crosswise direction of the conveyor belt and is slightly downward-sloping in the longitudinal direction of the conveyor belt.

3. Device according to claim 1 in which in each winding unit, disposed opposite and in line with the core and carrier, is a rotary dough strip carrier which is driven at the same speed in the same direction and has an oblong, controlled, to and fro moving take-up needle, which is disposed below half he carrier apex angle relative to the carrier centre line, and in the extended position is parallel to the outer surface of the carrier.

4. Device according to claim 1, in which the second part of the second belt is downward-sloping along half the apex angle of the conical carrier.

5. Device according to claim 1, in which a continuous layer of dough is fed in on the intermittently driven first belt and above this first belt a rotary knife movable crosswise thereto is disposed for cutting the dough sheet into strips.

6. Device according to claim 1, in which two rotary knives set up near the longitudinal edged of the first belt, working in the lengthwise direction of the belt.

7. Device according to claim 1, in which the second belt is driven continuously.

8. Device according to claim 1, in which a number of winding units are disposed in a continuously circulating conveyor system, so that high production speeds are possible.

9. Device according to claim 1, in which during the conveyance the carriers are easily removable and positionable by mechanical means by being magnetically clamped on the core.

* * * * *